May 20, 1924.
W. B. KERRICK
WHEEL
Filed Aug. 23, 1921
1,494,845
2 Sheets-Sheet 2
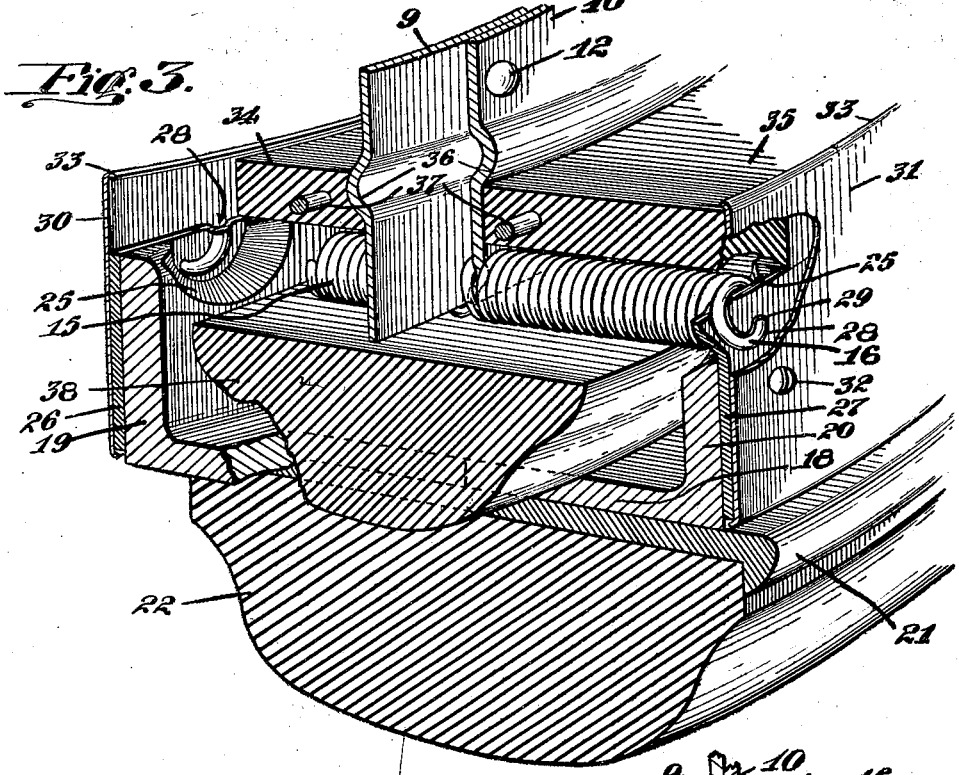
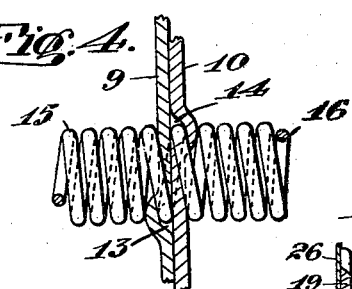
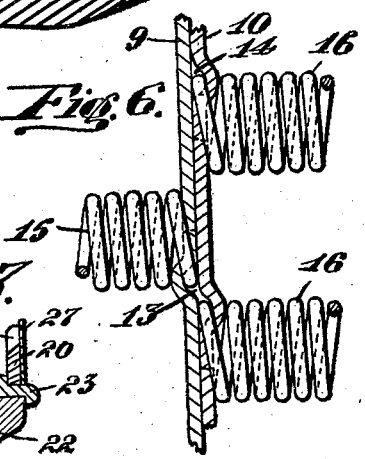
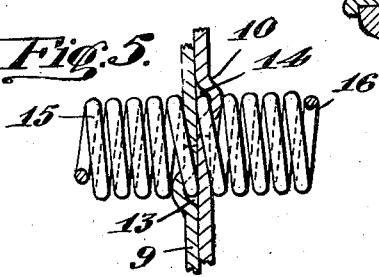
Inventor
Walter B. Kerrick
By R. S. Bump
Attorney Patented May 20, 1924.

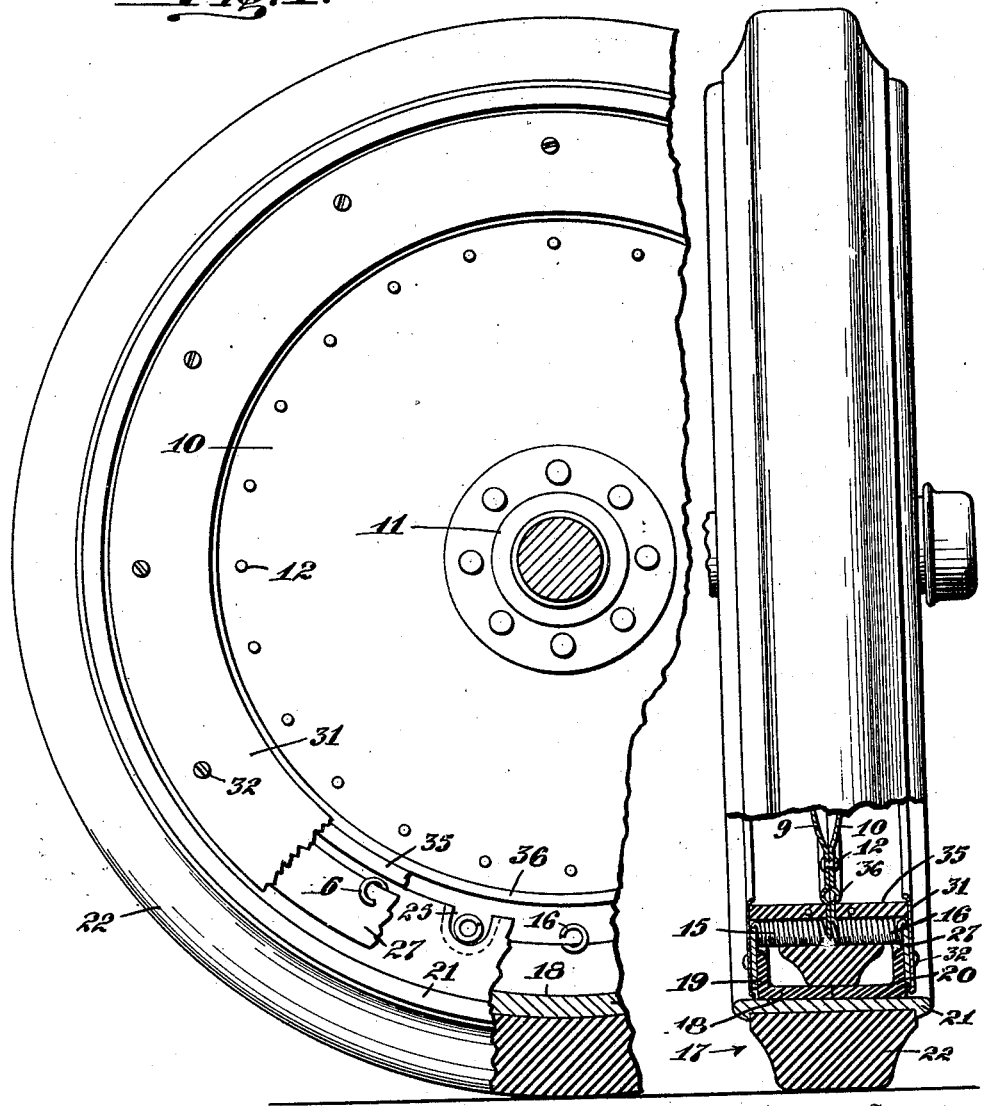

1,494,845

UNITED STATES PATENT OFFICE.

WALTER B. KERRICK, OF LOS ANGELES, CALIFORNIA.

WHEEL.

Application filed August 23, 1921. Serial No. 494,605.

*To all whom it may concern:*

Be it known that I, WALTER B. KERRICK, a citizen of the United States, residing at Los Angeles, in the county of Los Angeles and State of California, have invented new and useful Improvements in a Wheel, of which the following is a specification.

This invention relates to the construction of resilient wheels of the type embodying an inner member and an outer member connected together by helical or spiral springs arranged substantially parallel to the axis of the wheel.

An object of my invention is to provide a simple means in a wheel of the above character for demountably securing the springs in place whereby the springs may be readily removed and replaced and the parts quickly assembled, and in which the springs are so mounted as to be immovably and rigidly secured at their point of engagement so as to avoid sliding contacts and frictional wear incident to loose connections.

Another object is to provide a construction whereby the springs will be housed and thereby protected from dirt and water.

A further object is to provide means for cushioning flexure of the springs and opposing excessive movement thereof.

With the foregoing objects in view together with such other objects and advantages as may subsequently appear, the invention consists of the parts and the construction, combination and arrangement of parts or their equivalents hereinafter specified and claimed, and illustrated in the accompanying drawings, in which:—

Figure 1 is a view in side elevation showing a portion of a wheel construction in accordance with the invention, with parts broken away.

Figure 2 is an end view of the wheel partly in vertical section.

Figure 3 is a detail in perspective showing a cross section of the wheel rim and tire.

Figures 4, 5 and 6 are details showing various arrangements of the spring members that may be employed.

Figure 7 is a detail cross section showing a modified form of the outer wheel member with the springs removed.

More specifically, 9 and 10 indicate a pair of sheet metal disks or annular plates suitably mounted on a hub 11 and constituting an inner wheel member; the plates 9 and 10 being securely held together by rivets 12 or other suitable fastenings and are formed at intervals throughout their peripheral edges with substantially semi-circular or arcuate channels 13 and 14, which channels are disposed on the adjacent faces of the plates and open at the edges thereof. Projecting from the opposite sides of the plates are spiral springs 15 and 16 having coils disposed in the channels and rigidly clamped between the plates so as not to be capable of movement at their point of engagement between the plates, thus obviating friction or wear of the spring mounting. The springs 15 and 16 may constitute a single spring with an intermediate spiral engaged between the plates, as shown in Figure 4, or may comprise separate springs with their end coils engaged between the plates, as shown in Figures 5 and 6; the separate springs being either arranged in alignment with each other on opposite sides of the plates, as shown in Figure 5, or staggered in relation to each other, as shown in Figure 6.

The springs 15 and 16 are preferably arranged to extend substantially at right angles to the plates 9—10 and parallel to the axis of the wheel, and have their outer ends detachably connected to an outer wheel member 17 which encircles the peripheries of the plates 9 and 10 and is spaced therefrom. The outer wheel member may consist of a felly 18 having inwardly projected side flanges 19 and 20, which flanges are preferably integral with the felly 18 and are designed to extend inwardly in spaced relation to the plates 9 and 10. Where the flanges 19 and 20 are integral with the felly the latter is preferably divided circumferentially, so that the parts may be separated to permit the plates 9 and 10 of the inner wheel member being positioned between the flanges 19 and 20 of the outer wheel member. With this construction a rim 21 is provided which encircles the felly in tight engagement therewith and holds the parts of the felly together. A tire 22 of the cushion type encircles the rim 21 and is securely mounted thereon. The felly and rim may, however, constitute one piece, as indicated at 23 in Figure 7, and the flanges 19—20 formed of separate rings and seated on shoulders 24 on the felly, as shown in Figure 7. By this arrangement either of the ring flanges 19—20 may be removed to permit disposing the inner wheel member within the outer wheel member.

The flanges 19 and 20 are formed with slots 25 on their inner peripheries through which the outer end portion of the springs 15—16 are designed to extend, the slots being preferably arcuate and formed with beveled walls to afford clearance for the springs. Mounted on the outer faces of flanges 19 and 20 are sheet metal rings 26 and 27 which span the slots 25 and provide walls at the outer ends of the slots with which the end coils of the springs 15 and 16 are engaged; the rings being formed on their outer faces with arcuate channels 28 opening to the inner marginal edges of the rings, which channels receive the end spirals of the springs when the adjacent end spirals of the springs are placed astride the inner edges of the rings, as shown in Figure 3. The channels are formed with end walls 29 against which the terminals of the springs are adapted to abut.

Extending over the outer faces of the rings 26—27 are annular face plates 30 and 31 which are fastened to the rings 26 and 27 by screws 32 or other suitable fastenings and are adapted to clamp the end coils of the springs in the channels 28, so that the portion of the springs arranged in the channels will be rigidly engaged and held against sliding movement to prevent frictional wear of the outer of the spring mountings. The inner margins of the annular face plates 30 and 31 extend beyond the inner margins of the rings 26—27 and flanges 19—20 and are turned inwardly to form beads or flanges 33, and extending between the inner faces of the annular face plates and the outer faces of the disks 9 and 10 are flexible annular members 34 and 35, the inner edges of which abut against the disks 9 and 10 and the outer edges of which abut against the face plates 30 and 31. The disks 9 and 10 are formed with annular ribs 36 which provide shoulders on the outer faces on which the inner faces of the flexible annular members 34 and 35 seat at the inner edges thereof. The members 34 and 35 are preferably formed of rubber or rubber composition and are reinforced by metallic rings 37 embedded therein and serve to exclude dirt and moisture from the space between the inner and outer wheel members and afford a complete housing for the springs.

As a means for opposing too free flexure of the springs 15 and 16 and to prevent excessive movement of the springs and movement of the inner and outer wheel members relative to each other, a cushion member 38 is interposed between the inner wheel member and the outer wheel member, which cushion member preferably comprises an annulus of rubber or similar material and is formed with a broad inner periphery which bears against the outer portions of the springs 15 and 16 and has a narrower outer periphery adapted to seat on the inner periphery of the outer wheel member.

In assembling the wheel, the springs are arranged on the inner wheel member with the coils engaged between the plates 9 and 10, whereupon the outer wheel member and the cushion member 38 are disposed around the inner wheel member, as before described. The rings 26 and 27 are then set in place and each spring is distended by a suitable tool and has its end coil placed astride a ring and engaged with the arcuate channel of the ring, thus placing each spring under tension. After the springs are set in place the annular members 34 and 35 are put in position, whereupon the face plates 30—31 are secured to the rings 26—27 to clamp the outer end coils of the springs and also clamp the annular members 34 and 35 in position. The springs 15 and 16 being placed under longitudinal tension will act to yieldably oppose movement of the inner and outer wheel members relative to each other, while the cushion member 38 will serve as a bumper to prevent excessive flexure of the springs.

The rings 26—27 are made of sheet metal to facilitate the formation of the arcuate channels 28 and the flanges 19—20 are provided as abutments for the rings to hold the latter against becoming distorted or sprung under the pull of the springs; the portions of the flanges extending between the slots 25 serving to back the inner edges of the rings.

By the construction herein set forth, the wheel may be readily assembled and the springs securely fastened in place, and when the coils of the springs are clamped between the plates 9 and 10 of the inner wheel member and between the rings 26—27 and face plates 30—31 of the outer wheel member, the springs will be rigidly and immovably attached to said members so that there will be no sliding movement of the engaged coils, thus obviating frictional wear at the points of support of the springs, movement of the springs being confined to the flexure of the portion of the springs extending between their points of support.

By mounting and arranging the springs as here set forth, the inner and outer wheel members have yieldably opposed universal movement relative to each other.

I claim:

1. In a wheel, an inner wheel member, a rim encircling same and spaced therefrom, inwardly extending side flanges on said rim having spaced slots on their inner edges, a plate ring seating on the outer face of each of said flanges and spanning the slots, and a series of helical springs affixed to the inner wheel member; said springs extending through said slots and having the adjacent end coils thereof set astride the portions of said rings spanning the slots.

2. In a wheel, an inner wheel member, a rim encircling same and spaced therefrom, inwardly extending side flanges on said rim having spaced slots on their inner edges, a plate ring seating on the outer face of each of said flanges and spanning the slots, a series of helical springs affixed to the inner wheel member; said springs extending through said slots and having the adjacent end coils thereof set astride the portions of said rings spanning the slots, and means for immovably clamping the end coils of said springs on said rings.

3. In a wheel, an inner wheel member, a rim encircling same and spaced therefrom, inwardly extending side flanges on said rim having spaced slots on their inner edges, a plate ring seating on the outer face of each of said flanges and spanning the slots, a series of helical springs affixed to the inner wheel member; said springs extending through said slots and having the adjacent end coils thereof set astride the portions of said rings spanning the slots, and means for immovably clamping the end coils of said springs on said rings; said springs being also clamped in engagement with the inner wheel member whereby movement of said springs will be confined to their flexure.

4. In a wheel, an inner wheel member, a rim encircling same and spaced therefrom, a series of helical springs affixed to the inner wheel member and extending outwardly from the opposite sides thereof, a pair of rings carried by the rim, there being a ring disposed adjacent each side of the rim and the ends of the springs being affixed to said rings, and inwardly projecting side flanges on said rim against which the inner faces of said rings abut and by which the rings are held in spaced relation in opposition to the pull of the springs, said flanges being secured directly to said rim in spaced relation and being removable laterally from the rim.

WALTER B. KERRICK.